United States Patent
Wickert et al.

(10) Patent No.: US 9,480,998 B2
(45) Date of Patent: Nov. 1, 2016

(54) COMPOSITIONS AND METHODS FOR PROVIDING COATINGS; MATERIALS; APPLICATION TECHNIQUES; AND, RESULTING COATED SUBSTRATES

(71) Applicant: Polyguard Products, Inc., Ennis, TX (US)

(72) Inventors: Frank Wickert, Olmsted Township, OH (US); Ted Edward DeZurik, Colfax, WI (US)

(73) Assignee: Nuton, LLC, Colfax, WI (US)

( * ) Notice: Subject to any disclaimer, the term of this patent is extended or adjusted under 35 U.S.C. 154(b) by 0 days.

(21) Appl. No.: 14/873,298

(22) Filed: Oct. 2, 2015

(65) Prior Publication Data

US 2016/0023226 A1    Jan. 28, 2016

Related U.S. Application Data

(63) Continuation of application No. 13/905,407, filed on May 30, 2013, now Pat. No. 9,150,737, which is a continuation-in-part of application No. 13/314,377, filed on Dec. 8, 2011, now Pat. No. 8,741,388.

(60) Provisional application No. 61/654,293, filed on Jun. 1, 2012, provisional application No. 61/421,730, filed on Dec. 10, 2010.

(51) Int. Cl.
| | |
|---|---|
| *B05B 9/03* | (2006.01) |
| *C09D 7/12* | (2006.01) |
| *C04B 41/00* | (2006.01) |
| *C04B 41/48* | (2006.01) |
| *C04B 41/63* | (2006.01) |

(Continued)

(52) U.S. Cl.
CPC ............... *B05B 9/03* (2013.01); *C04B 41/009* (2013.01); *C04B 41/483* (2013.01); *C04B 41/63* (2013.01); *C09D 7/1216* (2013.01); *C09D 109/06* (2013.01); *C09D 127/06* (2013.01); *C09D 133/08* (2013.01); *C09D 135/06* (2013.01); *C09D 175/04* (2013.01)

(58) Field of Classification Search
None
See application file for complete search history.

(56) References Cited

U.S. PATENT DOCUMENTS

| | | | |
|---|---|---|---|
| 4,428,982 | A | 1/1984 | Wallace |
| 5,739,201 | A | 4/1998 | Ugai et al. |
| 7,205,259 | B2 | 4/2007 | Soerens |
| 8,741,388 | B2 | 6/2014 | Wickert et al. |

FOREIGN PATENT DOCUMENTS

WO    2012/003449    1/2012

OTHER PUBLICATIONS

International Search Report and Written Opinion for PCT/US2011/064107, dated Mar. 2, 2012.
Declaration of Inventor Frank Wickert dated Nov. 22, 2013.

*Primary Examiner* — Vu A Nguyen
(74) *Attorney, Agent, or Firm* — Merchant & Gould P.C.

(57) ABSTRACT

Techniques and compositions for applying films to a variety of substrates, from water-borne coating compositions, are provided. The techniques involve providing desiccant and applying the desiccant with water-borne film-forming composition, in application to a substrate. The desiccant composition provides for take up of free water in of the film-forming composition, without total reliance on ambient conditions, to advantage. Compositions, methods, techniques and resulting constructions are described. The techniques can be applied in wet thick film applications, but are not limited to such applications.

19 Claims, 1 Drawing Sheet

(51) Int. Cl.
*C09D 133/08* (2006.01)
*C09D 135/06* (2006.01)
*C09D 109/06* (2006.01)
*C09D 127/06* (2006.01)
*C09D 175/04* (2006.01)

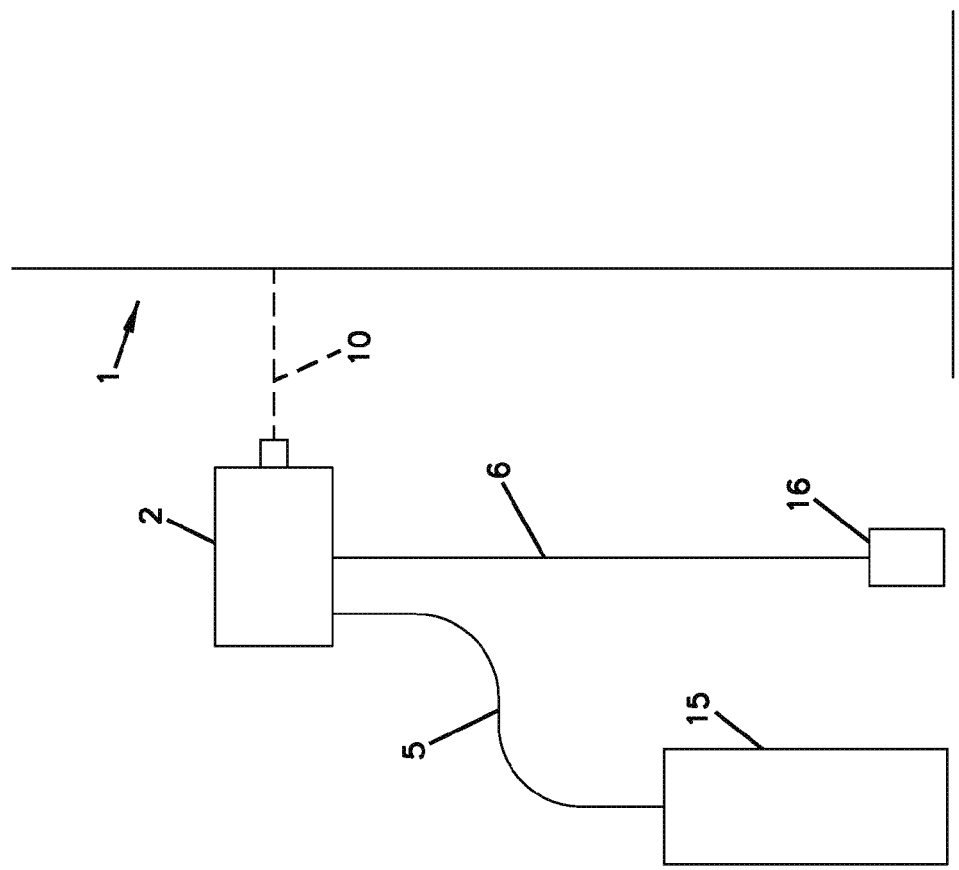

COMPOSITIONS AND METHODS FOR PROVIDING COATINGS; MATERIALS; APPLICATION TECHNIQUES; AND, RESULTING COATED SUBSTRATES

CROSS-REFERENCE TO RELATED APPLICATION

The present application is a continuation of U.S. Ser. No. 13/905,407, filed May 30, 2013, which issued as U.S. Pat. No. 9,150,737 and includes the disclosure of, with edits and additions, U.S. provisional 61/654,293, filed Jun. 1, 2012. The complete disclosure of U.S. Ser. No. 61/654,293 is incorporated herein by reference.

U.S. Ser. No. 13/905,407 was a continuation-in-part of U.S. Ser. No. 13/314,377, filed Dec. 8, 2011, which claimed priority to provisional application 61/421,730, filed Dec. 10, 2010. The complete disclosures of U.S. Ser. No. 13/314,377 and U.S. provisional 61/421,730 are incorporated herein by reference.

Claims of priority are made to each of U.S. Ser. No. 13/905,407; U.S. provisional 61/654,293; U.S. Ser. No. 13/314,377 and U.S. Ser. No. 61/421,730, to the extent appropriate.

FIELD OF THE DISCLOSURE

The present application relates to polymeric coating compositions and techniques applicable to provide coatings on substrates. In particular, the present invention relates to coatings that are applied as water-borne compositions, e.g. as latex-based compositions or sols. The techniques relate to providing drying agents or desiccants in films formed from such compositions in an advantageous manner, to facilitate coating application, formation and characteristics.

BACKGROUND OF THE DISCLOSURE

Polymeric coatings are applied as liquids to a wide variety of substrates. The coatings can be applied for a variety of reasons, for example, as protective coatings, decorative coatings, sealants, for insulation properties and/or to modify surface characteristics of the substrate to the surface characteristics of the coating.

In general terms, coatings applied as liquids comprise three primary components: pigment; binder; and, solvent. In this context, the term "pigment" is used to refer to non-film forming components. The term "binder" is used to refer to those materials that form the film, i.e. solid materials that provide the protective and/or functional coating. The third component (solvent) is a fugitive material that functions as a dispersing medium for the pigment and binder solids, and is a carrier for transporting the solid materials to the substrate. Once the coating has been applied, it is generally desirable to rid the applied coating of its carrier solvent as quickly as possible. For many coatings, the removal and carrier solvent trigger some form of film forming process and involves the evaporation of the solvent to the atmosphere. When the carrier solvents are organic in nature, they generally contribute to environmental problems (i.e. VOC levels and issues with VOC regulations). Of course when water is used as a solvent, VOC problems are reduced.

In the construction industry, protective and/or decorative coatings are applied to foundations, walls, roofs and various structures. The materials or substrates involved can comprise a variety of materials, for example masonry, cement, concrete, wood, fiber board, plaster, plaster board, metal, brick, paper, plastic, rubber, glass, asphalt and/or foam (e.g. styrene foam or polyurethane foam). The substrate being coated may comprise portions of more than one type of material. Some of the substrates can be quite irregular or porous, and thus difficult to coat. The substrates may be horizontal, vertical or of a variety of alternate configurations, or of complex shape and/or orientation.

Different issues may be presented, depending on the location and purpose of the substrate. For example, below grade structures (below ground level walls) often are subject to hydrostatic pressures from groundwater. The type of compositions applied as coatings to such structures may be intended, therefore, to provide both a good water barrier and a good vapor tight barrier.

Above grade exterior structures (for example above ground level exterior walls) are subject to weather and weathering effects, but it may also be desirable that they be configured to "breathe", i.e. allow passage of water vapor therethrough, to allow internal wall regions to dry.

Issues with formulation and application of protective coatings to a wide variety of substrates concern such variable factors as: environmental conditions during application; drying time issues; coating thickness issues; application conditions; and, logistical issues. Environmental conditions, for example, can relate to whether the coating is applied in an internal closed environment, or an external, outside, open environment. Coating thickness issues can relate to how thick the coating application needs to be, to be effective for the intended result and to manage structure variations, when the substrate has surface variations or irregularities. Issues also relate to the propensity of coatings, applied to vertical surfaces, to slough, sag or wash off prior to full cure or set up. Application condition issues can relate, for example, to: weather conditions, especially if exterior application is involved; humidity conditions; and/or dust conditions. The logistical issues can concern such factors as: whether specialized personnel or equipment are needed for application; potential disruption of construction site processes during application; selecting and waiting for appropriate temperature/weather/environment conditions for application of the coating and set up; in some instances a need for tenting the region to be coated, and even using heaters for the tented region; and, related logistical issues that concern construction costs, timing and delay issues.

In addition, a variety of issues can relate to the carrier fluid for the coating. That is, the coatings are typically applied from suspension or solution, i.e. in the form of flowable liquid. Organic solvents or carriers can create health and/or environmental issues: during application and carrier fluid evaporation; and/or during formulation, handling and storage. Aqueous carriers can raise issues with respect to maintaining composition integrity during handling, storage, and application; and, greater sensitivity to: environment conditions such as weather (temperature and/or humidity) during application and water evaporation (drying).

As a practical commercial matter, compositions and techniques developed for coatings that are formulated for application to construction materials and surfaces, need to be developed to manage wide variations in the above variables. Indeed, in formulating compositions for application, for example at construction sites, such variables as: substrate material type; substrate surface orientation; interior/exterior applications; and, any temperature/humidity variations; etc, are preferably managed so that a selected coating composition is satisfactory for as wide a variety of situations posed by these variables, as reasonable. That is, it is not, as a practical matter, desirable to need to specifically formulate a composition that is dependent on too many of the above variables in the field. Rather, it is desirable to provide a minimal number of coating compositions that are applicable to a wide variety of substrates under a wide variety of circumstances, for effective practical commercial application.

In addition, it is desirable to formulate coatings that do not require special, difficult to manage, handling application techniques in the field, to the extent reasonable, so they can be applied by a wide variety of application personnel without highly developed, specialized, knowledge. That is, a commercial composition that is intended to be successful, for wide and extensive use, is preferably one for which special on-site supervision during handling and application is not required, but rather which is formulated to be appropriate for effective application by personnel with a limited amount of necessary background, training and supervision.

Coating formation in thick film applications, when needed and intended, has raised significant issue in the context of coatings for construction materials and similar applications. Especially when applied as a thick wet film, film distortion and integrity loss can occur with resulting blistering, puckering and/or other flaw formation during cure or film set up. Also sagging and sloughing can affect resulting dry film integrity further, and with thick films initial adherence issues can be exaggerated. These variables are preferably managed by the formulator of the composition, so that in field applications undesired levels of problems are avoided.

In addition, cost factors are of significant concern. It is desirable that the formulation be developed with materials such that composition costs and application costs are not unacceptable burdens for the construction projects involved. Also, variations in construction specification and regulation issues need to be met in a variety of jurisdictions for a variety of projects, by a commercial composition, for it to be effective. Thus, the materials used are preferably materials of known property and characteristic, so that extensive environmental and health evaluations are not required for the product to be accepted.

These and other issues are of concern, when developing compositions for wide construction and construction material application, and are taken into consideration by such companies as Protective Coatings Technology, Inc. of Menomonie, Wis., 54751 (now part of Polyguard Products Inc, of Ennis, Tex., a provider of such products). The present application provides compositions, composition formation techniques and methods of practical application to address the issues identified above, on a useful, commercially practical, scale. It is noted that the techniques can also be applied in a wide variety of alternate applications not necessarily involving construction sites and materials.

SUMMARY

According to the present disclosure, compositions and techniques for applying water-borne coating compositions to substrates are described. In certain selected and preferred applications, the techniques generally involve applying (with intimate mixing, typically during or immediately prior to applying) two compositions: (1) water-borne film-forming composition (Side A); and, (2) desiccant composition (Side B). The desiccant composition is introduced into the water-borne film-forming composition, to absorb free water as the application is applied, and during film set up or cure. This means that the applicator does not rely solely on free water evaporation from the film to the atmosphere for set up of the film. Rather, the desiccant captures free water and remains embedded in the film, after film formation.

Herein, formulation principles and techniques for the desiccant composition are described. Such compositions can be used with a wide variety of water-borne film-forming compositions, during application to substrates. Techniques usable, for example, to provide wet (and often thick) films on substrates, in the field, are described. Thus, the techniques are well developed for use in the field of construction coatings, for example on walls and other building surfaces and/or at joints.

The techniques can be applied in a wide of variety of applications and with a wide variety of substrates. The techniques can be applied with a variety of polymer compositions, and generally relate to absorption of free water to facilitate set up of the film or coating, as opposed to the film polymer composition.

Techniques of application, and resulting substrates are described. Useful coating compositions are described. Example two-part, or two-component, sets or systems are also described, usable to provide preferred coatings on substrates.

BRIEF DESCRIPTION OF THE DRAWINGS

FIG. 1 is a schematic representation of a step of applying a coating formed from a two-part coating compositions in accord with the present disclosure, to a vertical construction surface.

DETAILED DESCRIPTION

I. Water-Borne Film-Forming Compositions; Thick Film Issues

A. Water-Borne Films or Coatings for Construction Substrates—Generally

It is often preferable that, where possible, construction films and coatings be applied as water-borne film-forming or coating compositions. Reasons for this relate to the fact that, in general, water-borne compositions provide less issue with respect to environmental, health and safety concerns, during formulation, storage, handling and drying; and, often, lower costs. Water-borne coatings are well known and understood, and many are generally referenced as "latex coatings" and/or "sols."

In general, with a water-borne film-forming or coating composition, polymer particles are suspended in a water or aqueous-based carrier. Once applied, film set up or cure occurs as the water evaporates to the atmosphere. Indeed, it is evaporation of (or loss of) the water that brings about close packing of the polymer particles, leading eventually to coalescing or fusion of the film. Herein, coalescing and fusion of the film will sometimes be referred to as "set up" or by similar terms. It may also be referred to as "cure", although by that term, as used herein, it is not necessarily meant that any chemical reaction occurs.

Even under ideal drying conditions in the field, latex coatings can take a relatively long time to set up and cure (several hours or more). During this time, they are especially susceptible to damage, for example by being washed off or otherwise damaged.

In spite of the strong preference for water-borne coatings, in many commercial applications such as those described in U.S. Pat. No. 7,825,171, incorporated herein by reference, coatings are applied from liquid, organic-based, compositions. The reasons include that: organic carrier materials often dry more rapidly than water; and, it can be more straightforward to maintain the components of an organic coating in suspension/solution, in an organic solvent or carrier.

Again, a variety of problems are related to conditions of drying water-borne (e.g. latex or sol) coating compositions. Besides the issues of settling during storage, there are practical issues relating to the composition application. These, again, include that relatively long drying times can be necessary for aqueous-based coatings, and the limited temperature/humidity conditions acceptable for application of aqueous-based coatings. Other issues arise that relate generally to the application demands.

In order to ensure formation of an effective coating for construction applications, it is necessary to ensure that the substrate is very well coated with the composition, in spite of variations in the substrate surface, such as: cracks or rough surface material variations; joints; penetrations; etc. Typically, in the field, to obtain a sufficiently thick "wet" application to ensure coating in spite of surface irregularity, material variations, joint and penetration issues, the film often needs to be applied with a wet thickness of at least 5 mils, and sometimes at least 10 mils, typically at least 20 mils, usually at least 30 mils, and in many instances at least 40 mils, with a typical thickness being 40-60 mils, inclusive, or thicker. (1 mil=0.001 inch or 0.025 mm, so for the alternatives stated: at 0.125 mm, often at least 0.25 mm, typically at least 0.5 mm, usually at least 0.75 mm and in many instances at least 1 mm, for often 1-1.5 mm, inclusive or more). In some instances, the thickness are 100 mils (2.5 mm) or more, for example 200 mil (5 mm) or more. Such wet thick film applications exacerbate the issues and concerns, when water-borne coatings are involved.

For example, in many instances, the construction surface to which the film is applied is vertical (or nearly vertical) or even inverted (for example a ceiling). A thick wet applied film may tend to distort under gravity, i.e. suffer slough or sag, lending to distortions or irregularities in the resulting film that are unacceptable. This is exacerbated by the fact that with a water-borne coating, and relatively extended drying time, there is more opportunity for distortion, slough, sag or coating damage.

Especially with relatively thick water-borne coatings or films, the act of drying (free water evaporation) itself can also raise issues. As the water is evaporated from the coating, the coating becomes thinner and can distort. The water evaporation can lead to blisters, puckering or other irregularities in the coating (film), i.e. loss of coating integrity. This issue is exaggerated with water-borne coatings, as the coating thickness is increased, since such films dry from the outside in; and, trapped water needs to escape, as part of the drying or set up process (cure).

As indicated above, environmental conditions can also be an issue with water-borne coatings. The extensive drying times required can mean that long construction stops are necessary. The wait times for the right temperature and humidity circumstances, at construction sites, for a proper, even, drying (set up or cure) can create delay and expense. Unanticipated weather patterns (temperature, precipitation, humidity) can result in an undesired resulting coating or film, and the need for multiple coating applications.

Consider, for example, issues relating to applying an exterior coating in a selected construction location. If the intent is to provide the coating as a water-borne coat (film) forming composition, such as a latex, in colder regions, it may be necessary to provide a tent over the construction region of interest, and even provide heating to the location regional site, for application and drying of the coating. With typical water-borne film forming compositions, in which environmental (air) drying is used, it is generally recommended that the coating not be applied unless the region being coated, and/or the environment, is above 40° F. (4.4° C.) or thereabouts.

Indeed, it is many of these concerns that have (in part) led, in the past, to preferences (in many circumstances) for application for organic carrier-fluid coating types, see for example U.S. Pat. No. 7,825,171.

B. A General Approach to Practical (in Some Instances Thick) Film Water-Borne Film or Coating Formulation and Application—Desiccant Inclusion in the Applied Film.

In accord with the present disclosure, techniques are provided for facilitating application of water-borne coating compositions to form coatings or films on a wide variety of substrates, for example, on construction materials and/or at construction sites. This generally involves providing, in the coating or film as applied, a drying agent or desiccant that absorbs (attracts or captures) at least a portion of free water within the film, reducing set up time, i.e. accelerating film formation, set up or cure. When a desiccant or drying agent is included in the film as applied, the carrier (free) water does not need to dry only through evaporation to the atmosphere. Rather, the drying agent or desiccant absorbs (attracts or captures) the water, and remains engulfed in the film once set up (cured). Alternately stated, the water does not need to leave the film for film set up to occur. Rather, once it migrates to the desiccant and is absorbed (captured), the result is an effectively "dry" (i.e. set up or cured) film.

With respect to the above mode of operation, it is not meant to be indicated whether the water, over the long term, remains captured by the desiccant. Indeed, in some instances after film set up, formation or cure, water may slowly migrate out of desiccant and evaporate to the atmosphere. However, this will generally occur after the film set up or cure.

Herein, the term "desiccant" and "drying agent" are used interchangeably and are meant to refer to any material capable of taking up free water and holding it (i.e. capturing free water). The term "absorb" and variants thereof, are not meant to indicate any specific mechanism of free water take-up, attraction or capture, for example whether through adsorption, absorption at reaction, and are meant to be inclusive of each, and any variant thereof. All that is meant by "absorb" herein is that water is taken up (attracted or captured) by the desiccant or drying agent in a manner that results in a enhancement to set up or cure of the coating, film, membrane or barrier.

It is noted that in some fields, a desiccant may be referenced as "active" or "inactive." The term "active" in this context is meant to refer to desiccant that has not been fully loaded with water. Of course, an "active desiccant" can also be merely "partly active" if it already has some moisture absorbed therein, but is still capable of absorbing more. Herein, it is intended that the desiccant be active (i.e. at least partly active), when the composition is applied, so that it is capable of absorbing free water in the composition.

Typically, the desiccant is of the type which attracts and holds the water, but does not generate any reaction product with the water that seeks to escape the system. For example, typically the desiccant is one that does not generate a volatile product when contacted by the water.

There are additional advantages with respect to the film integrity and formation from such an approach. For example, the film does not merely dry from the outer surface in, when the desiccant or drying agent is used as described herein, in contrast to water-borne films that are applied with free water removed only by water evaporation to the atmosphere. This means there will be less film distortion or film integrity loss, due to evaporation and/or the time of evaporation. It also means that substantial amounts of free water will not be trapped underneath outer portions of the film and against the substrate, as the film forms.

It is important to note, however, that, in general, the active desiccant cannot, as a practical matter, merely be applied to the water-borne coating composition by the formulator significantly prior to application. Reasons for this relate to the fact that the active desiccant, if merely incorporated in the coating composition, without some modification, will immediately cause the coating composition to begin to substantially thicken. Thus, if the active desiccant was merely mixed with the coating composition in a storage container prior to application, the coating composition could no longer be sufficiently fluid for application. If merely mixed in a container, in the field, prior to application, similar problems could result, especially when the desiccant or drying agent is selected to absorb free water rapidly, which is preferred (especially for thick film applications) so that drying occurs as rapidly as reasonable.

Therefore, certain preferred applications of techniques according to the present invention relate to adding, preferably with intimate mixing, the desiccant to the coating composition during, or immediately before, film application. It also means that immediately upon application, rapid drying of the composition and setting up of the film occurs.

Techniques to accomplish this are discussed further herein below. Here, this point is merely meant to be an indication that the techniques and compositions described can be formulated for an application approach in which a film forming composition and desiccant or desiccant composition are separately formulated and stored, are kept separate in field, but can be formulated to be brought together (typically simultaneously and continuously) during application.

With many of techniques described, it has been practical to include the desiccant in a carrier fluid that is compatible with the water borne and film forming composition, but which is such that it allows the desiccant to remain dry (i.e. avoiding water exposure) in storage. This is discussed further below.

In general, regardless of the particular water-borne coating (latex or sol) involved, the amount of desiccant or drying agent chosen will generally be at least a "minimal effective amount." By the term "minimal effective amount", and variants thereof, in this context, it is meant that as applied, the film includes sufficient (active) drying agent or desiccant therein, to absorb enough water to provide for beneficial effect. Typically, the capacity for the desiccant to absorb free water will be a known to the formulator. The formulator can then ensure that sufficient desiccant is present, to absorb an amount of free water understood to be desirable with respect to the amount contained in the water-borne coating composition. Typically, for a construction surface coating, an amount of desiccant capable of absorbing at least 30%, for example at least 50% of the free water, usually at least 75% of the free water, often at least 90% of the free water and sometimes preferably at least 95% of the free water, will be used. In some instances, it may be desirable to have the desiccant present in an amount adequate to absorb 100% of the free water, and it may even in some instances be desirable to provide a slight excess of desiccant, to manage any issues relating to extra water that may enter the film environment, for example from the ambient environment. However, with some polymers it may be desirable to leave a small amount of interstitial water in the polymer, to facilitate film formation or set up, after application. When this is the case, it may desirable to use an amount of desiccant that that leaves the amount of free water in slight excess.

In some instances, for example with alternate applications of techniques according to the present disclosure to materials other than construction surfaces, coatings may be involved for which it is desired to only absorb less than all or most of the free water present, generally to minimize drying issues but without introducing too much of the desiccant into the composition, for desired film properties. Here the desiccant may be introduced at a level to absorb relatively low amounts of the free water, for example, at least, often at least 10%, typically at least 20%, in many instances at least 30% (as an example, 30%-50%) if desired.

Desiccant choice will typically be a matter of preference based on other factors than merely ability to absorb and retain water, once this characteristic is present. For example, desiccant choice may relate to: ability to disperse in a composition without settling; cost and availability; adhesion promotion capability; and transparency issues.

An example a desiccant or drying agent usable in compositions according to the present disclosure is Portland cement. Portland cement primarily comprises calcium silicates; i.e. $CaO.SiO_2$, for example $3CaO.SiO_2$ and $2CaO.SiO_2$. The ratio of CaO to $SiO_2$ is typically not less than 2.0. Other materials are typically present, in minor amounts, for example calcium sulfate and magnesium oxide. Portland cement is an example of an "inorganic" desiccant. While there is no specific requirement that the desiccant be inorganic, i.e. not contain materials with carbon-carbon bonds, many usable desiccants will meet this definition.

Herein, mere reference to Portland cement, is meant to be a reference to ordinary Portland cement (OPC). By this, it is not meant that the desiccant cannot be a modified Portland cement, merely that ordinary non-modified Portland cement is usable.

Portland cement is typically capable of absorbing up to five times (5×) its weight in free water, very rapidly. Further, it can act as an adhesion promoter, with respect to various construction substrates, for example metal. Also, it does not generally interfere with film properties, and can act as a filler within the resulting polymeric film. Further, it is widely available at convenient cost. A wide variety of desiccants or drying agents can be used, however, examples including, but not limited to: calcium oxide; phosphorous pentoxide; aluminum phosphate; aerogel(s); glycerin; perlite; vermiculite; attapulgite clay(s); calcium sulfate (plaster of Paris), polyacrylate acid salts (for example sodium salts) and/or bentonite clays. Mixtures of desiccants can be used.

C. Desiccant Composition Formation

Many desirable desiccants, for example such as Portland cement or calcium oxide, are obtained in fine particulate (fine particle or powder) form. In many instances, it will be desirable to suspend the desiccant in a carrier fluid, in order to rapidly distribute it with the film-forming composition. However, the desiccant composition can be provided in a solid or liquid form, depending on whether the desiccant is added to the film-forming composition as a solid, or as a material dispersed in a liquid carrier. Typically, when a liquid carrier is used for the desiccant, the liquid carrier is chosen from non-aqueous materials that are either water miscible or water-soluble.

In accord with techniques described herein, in a typical application including mixing the desiccant with the film-forming composition during or immediately before application, the desiccant composition is formulated separately from, and is stored separately from, the water-borne film coating composition. The two compositions are typically brought together with intimate and continuous mixing, during actual application of the coating to a substrate, for example at a construction site in the field. A typical approach would be spray coating a composition, during which, within spraying equipment and simultaneously with the spraying, the two compositions are intimately and continuously mixed. Thus, by the phrase "mixing during application" and variants thereof as used herein, reference is generally meant to a mixing of the composition continuously with application, and not substantially before application.

Alternately stated, it is preferred that, when the compositions are specifically formulated for application as described herein, there be no substantial volume of mixed composition that stays stagnant, prior to application. A reason for this is that desiccant effect is often too fast for this approach to be practical.

It will typically be desirable that the film-forming composition and desiccant composition be mixed as continuous flowing streams, when the application is occurring. Preferably, the time after mixing, until application on the substrate, is less than a minute, usually less than 30 seconds, in many instances less than 10 seconds, and it is anticipated it will preferably be no more than 5 seconds in some applications of the techniques described herein.

In general, the desiccant composition, then, is often formulated to include the desiccant well suspended in a non-aqueous, fluid, environment. It is typically selected so that the amount of desiccant which is distributed in the film, is adequate to absorb the desired amount of free water in the water-borne coating, to facilitate film set up in a preferred manner. Typically, then, formulation is based on such factors as: the amount of desiccant necessary, per unit volume or weight of water-borne coating composition, to achieve the desired set up; and, the volume of carrier fluid (if used) necessary to get the desiccant well distributed without undesirable levels of settling; and, with a volume-to-volume ratio appropriate for applying the desiccant composition and water-borne coating composition to the substrate, together, during application.

Typically, the carrier fluid chosen for the desiccant, when the desiccant is suspended in a carrier fluid, is non-aqueous, so that the ability of the desiccant to absorb water from the water-borne film forming composition is not reduced and so that undesirable water is not added by the desiccant composition. Similarly, preferably the carrier fluid for the desiccant composition, when used, is one that is not very hygroscopic, i.e. does not readily absorb water, so that during storage and handling water is not absorbed into the desiccant at a rate that would undesirably effect (deactivate) the desiccant.

Typically, the carrier fluid for the desiccant composition is soluble in water (or at least is water miscible) to facilitate mixing when the two sides are brought together. That is, preferably the carrier fluid is not a material that tends to form a separate phase when brought into contact with water.

In many typical applications, the desiccant is provided in a finely granulated or powdered form, and is mixed into a carrier fluid that has desirable properties for intimate mixing with the water-borne coating composition during application. In typical such applications, the carrier fluid selected for the desiccant or drying agent can be coalescing solvent for the polymer system involved. Indeed, in some instances choosing coalescing solvent for the desiccant composition can allow a formulation of the water-borne film-forming composition (Side A) with less coalescing solvent therein, than would otherwise has been typical. In general, the term "coalescing solvent" as used herein in this context, is meant to be used in its general sense in the water-borne film-forming (latex) coating industry to refer to materials that provide one or more of the following: reduction in the total surface energy of the system by reducing polymer surface area; increase in capillary forces by controlling of evaporation of water; reduction in repulsive forces between polymeric particles; and, facilitation of deformation of particles in contact with each other by effectively lowering the $T_g$ of the polymer. Typically, the coalescing solvent, for polymer formulations of the type used for film formation on construction substrates, will be non-aqueous material(s) often high molecular weight ester(s) or ester alcohol(s). A wide variety of coalescing solvents that are commercially available for water-borne polymer coating, can be used as the carrier fluid in the desiccant composition of the present disclosure. A specific example of such material is Texanol, an ester alcohol available from Eastman Chemical. The coating solvent can be selected for low or zero voc. For example, Oxi-Cure 1000, available from Cargill Inc, of Minneapolis, Minn. 55440, can be used. Another usable coalescing solvent type is Hexasol solvents (glycol ethers), available from Arkema Inc., Philadelphia, Pa. 19103. Yet another usable carrier solvent is NMP, i.e. n-methylpropylene (available from BASF). Also, PNP's (glycol ethers) can be used. Mixtures are usable. An example is a mixture of NMP and PNP. For example, at about 40/60 to 60/40 (typically about 50/50) by volume.

Additional (adjuvents) may be included in the desiccant composition. For example, emulsifier or dispersant, to facilitate dispersion of the desiccant or dying agent, can be used. An example of such emulsifier or dispersant is Lica 38, a organic titanate coupling agent. A useable commercially available titanate coupling agent is available from BIOtech Products, LLC of Randolph, N.J. 07869, as BIOchem C-3 PR65. This material comprises a mixture of an organic titanate, an organic amide and a hydrated amorphous silica. Another useful emulsifier is Bykumen, available from ByK.

In more general terms, a dispersion agent is a material that operates to disperse the powder of the desiccant or drying agent in the liquid composition. It can be characterized as a surfactant, typically operating as an anionic dispersant when used in typical applications according to the present disclosure.

A typical desiccant composition can be formed by adding the dispersant (emulsifier) to the solvent, with mixing in a high speed disperser. The drying agent or desiccant (cement) can then be added, again with high speed dispersion.

Suspending agents can be included to help maintain the cement (desiccant) in dispersion. Example suspending agents include various clays, for example, attapulgite clay(s). A usable clay is Garamite 1958, an attapulgite clay available from Southern Clay Products, Inc., a Rockwood Specialties, Inc. Company, Princeton, N.J. 08540.

In more general terms, the suspending agent is an agent or mixture that operates as a stabilizer or thickening agent. That is, it creates an increase in viscosity or apparent viscosity, to facilitate inhibition of settling, of the desiccant or drying agent.

In some instances, it may be desirable to include extender pigments such as ceramic microspheres.

It is also desirable to include in the desiccant composition, a carrier solvent or compatibilizer that will facilitate suspension of the particulates in the side B non-aqueous solvent, while at the same time facilitate good mixing with the side A aqueous composition. Such components operating as a carrier solvent in the side B will typically be chosen from materials that are also water soluble. Examples include non-ionic hydroxyl propyl cellulose ether(s), such as Klucel M, available from Kremer Pigments, Inc., Gonzalez, Tex.

The amount of drying agent or desiccant included, per volume, in the desiccant composition will be chosen based, in part, upon the volume ratio of the application technique involved, of the aqueous-based coating composition (A side) to the desiccant composition (B side). Typically, for techniques described herein below, the volume ratio A side to B side will be at least 1:1, usually at least than 2:1, sometimes at least 3:1, and most often within the range of 2:1-12:1. In many practical systems it will be within the range 2:1-8:1, inclusive.

By knowing the volume ratio of the composition (A side and B side) for the application technique involved, and by understanding the amount of water in the water-borne composition (A side) to be absorbed or captured, and also by understanding the water-absorbing characteristic of the desiccant (for example, Portland cement can absorb about five times its weight in water), one can readily determine the amount of desiccant that needs to be intimately dispersed in a selected volume of carrier fluid for the desiccant composition.

As a practical matter, it is desirable to use as little desiccant composition (by volume) as reasonably appropriate and as necessary for the intended application. Reasons for this not only relate to advantages in storage, shipping, handling and costs, but also concern practical application issues. The coating intent is to obtain a sufficient amount of water-borne polymer composition per unit of area on the substrate being coated. The less volume in the applied wet coating taken up by desiccant composition and application, the easier and more effective the overall coating process can be in many instances.

With a material such as portland cement used in the desiccant, a reason it is typically preferred that the volume ratio of Side A to Side B be at least 1:1 or greater, is that at about 1:1, the desiccant composition will typically only comprise no more than about 10%, typically no more than about 5%, by weight of total composition, desiccant. At such a relatively low concentration of desiccant, not only is the excess solvent present wasted, but formulating in a manner that comprises a stable dispersion can be difficult. At a volume ratio Side A:Side B of greater than about 12:1, the desiccant composition could include a concentration of portland cement of about 70% by weight, of total composition. Such a composition will be difficult to formulate, and may be at the end of acceptable viscosity for typical mixing an application techniques. Of course, in making these observations, assumptions were made about the amount of water in the Side A (coating) formulation. However, the assumptions were based on typical water-borne coating compositions. Again, it is expected that usually the ratio of Side A to Side B will be at least 1:1 and usually in the range of 2:1 to 8:1.

II. The Water-Borne Film or Coating Composition (Side A)

The water-borne film (or coating) composition, used as Side A, can, for example, be a latex or sol, comprising a suspended organic composition having desirable properties for the intended application. The term "latex" and variants thereof, as used herein, is meant to be used in its general sense of application in the coatings and film industry. In general, a latex is a stable dispersion (emulsion) of polymer particles (sometimes referenced as micro-particles) in an aqueous medium. Such latexes can be made by polymerizing a monomer that has been emulsified, for example with surfactants. The term "latex" is sometimes used in reference to an organic coating, once dried, which has been deposited from an aqueous medium.

The term "sol", as used herein, is also meant to have its general meaning of referring to colloid suspensions of particles in a liquid medium, in particular in an aqueous medium.

The term "water-borne" as used herein, in reference to a coating or film, is meant to refer to a composition containing an organic or film precursor for deposition on a substrate, in which the carrier fluid is water (or is primarily water) that is dried, as the film is formed, cured or set up. The term is not meant to be specific with respect to the nature of the deposition or the nature of the included polymer. It is not meant to be limited to either or both of latexes and sols. It is meant to be a general term, referring to the fact that a free carrier fluid that needs to evaporated, dried or otherwise taken up, for the set up or cure of the coating or film, is primarily water.

The terms "coating", "film", "membrane" and variants thereof, as used herein, are meant to be interchangeable unless otherwise specified. The intended reference is meant to be to a film, coating, membrane, layer, etc. which is left on a substrate after deposition and set up or cure, for example as applied from a latex or sol.

In general terms, as indicated previously, water-borne film forming compositions are generally compositions from which, once applied, free water is taken up, with eventual coalescing or fusion of the polymer particles to form the polymer film. Traditional approaches involve taking up of the water by evaporation, i.e. water leaving the composition by evaporation to the atmosphere. With the current techniques, a similar process is involved, except water take up is at least partially by desiccant that remains in the film. When a large amount of water take up is by the desiccant, a difference in film formation is that when evaporation is the only technique for taking up of the water free or leaving of the free water, drying or set up occurs from the outside in. In contrast, when sufficient desiccant is present, simultaneously a water take up, through a depth of the film, occurs.

Herein, reference to film set up or cure, is meant to be general and not specific to a mechanism involved. It is also noted that the term "film-forming composition" is not meant to indicate that there are no components in the desiccant composition that relate to film formation. Again, for example, the desiccant composition can be formulated to include materials to help form the film, for example coalescing solvent and in some instances the desiccant composition can include some film-forming polymer.

The term "wet film thickness" and variants thereof is meant to refer to the average thickness of the coating or film as applied to a substrate, prior to drying of the carrier medium. The term "dry film thickness" and variants thereof, as used herein, is meant to refer to the average thickness of a remaining film or coating on the substrate, once drying of any carrier media has occurred.

The term "thick film application" without further variation, when used in reference to the wet film thickness, is meant to refer to wet film having a thickness of at least 10 mils. The term "thick film" used in application of dry film thickness, without further variations, is meant to refer to a dry film having a thickness of at least 10 mils (0.01 inch or 0.25 mm).

As indicated above, the thick film forming or coating composition can be formulated to leave a film with a specific chosen set of characteristics. For example, a vapor barrier film and/or waterproof film can be formed. The particular materials selected for the film forming component of the composition, will be selected from now known and available, or future developed, materials deemed appropriate for the intended application.

The polymer material suspended in the latex or sol will sometimes be referenced herein as the "polymer binder resin." The term "polymer" is meant to include monopolymers (homopoylmers) or copolymers, or both, unless otherwise indicated.

Techniques described herein can be used to apply a wide variety of polymer resins, via water-borne compositions, to form coating or films on substrates. There is not intended to be a specific limitation suggested as to those resins that can be used.

The polymeric materials will be chosen, for the desired property of the coating involved. Acrylic polymers may be useful when moisture passage through the polymer is desired or acceptable. However, when moisture barriers are intended, and may be preferable to use SBR (styrene-butadiene rubber) or PVC (polyvinyl chloride) materials. Polymer blends can be used. For example, the term "acrylic polymer" as used herein, is not meant to indicate that the sole polymer components are all acrylics. Blends may be useful to provide the polymer with desirable elongation properties, for example. Thus, blending with polyurethane dispersions may be helpful, whether the polyurethane is aliphatic or aromatic, or a mixture of both.

Styrene and styrene-containing polymers (styrene based polymers) have been used in construction polymers and can be used in applications according to the present disclosure. However, styrene polymers (where styrene is the only component) are relatively hard, and it may be desirable to use polymers in which styrene is used as a comonomer, for example in SBR polymers to provide more desirable characteristics.

Usable polymers include, but are not limited to, Carboset AE-960, an acrylic emulsion available from Lubrizol, Wickliffe, Ohio, for example blended with Impranil DLU, a polyester-polyester polyurethane dispersion available from Bayer.

B. Other Possible Components/Additives (Adjuvants) for the Film Forming Composition 1. Fillers Fillers may be included in the water-borne film-forming composition. Typical fillers include calcium carbonate, wallostonite and/or microspheres (for example ceramic microspheres). Any of variety of fillers compatible with polymer system intended can be used.

It is noted that in many instances, the desiccant chosen will also operate as a filler. Thus, in formulating the water-borne film-forming composition, with respect to filler choice and amount, it may be desirable to take into consideration that the mixing which will occur at application, will lead to desiccant incorporated as filler.

2. Other Optional Components

A wide of variety of additional adjuvents can be included in the water-borne film-forming composition. Pigments or dyes, antioxidants, UV absorbers or blockers, ozone blockers, plasticizers and mold inhibitors are among the adjuvents that may be useful in some instances.

It is often desirable to include a pH adjuster in the side A composition, if, otherwise, the pH of the side A composition would be substantially different from the side B composition. For example, when the side B composition includes Portland cement, it may tend to be relatively alkaline. It can be desirable to include a pH adjustor in the side A composition to move the pH to 9-10 to facilitate the mixing. An example of such pH adjuster would be an amine pH adjuster, such as AMP 95 discussed below.

It may be desirable to include freeze thaw agent(s) in the side A composition, such as propylene glycol. Further, it can be useful in include as a thickener, a colloidal agent, to help prevent particulate from coagulating. An example such material would be a xanthan gum; for example Optixan D, referenced below.

Herein, no specific limitation with respect to adjuvents that may be included in the water-borne film forming composition is meant.

C. Formation of the Water-Borne Film or Coating Composition

The water-borne film or coating composition can be formulated using standard techniques in the formation of such compositions. It has already been noted above that in some instances, with techniques according to the present disclosure, when the desiccant composition is formulated to use a carrier fluid that operates as coalescing solvent for the polymer, it may desirable to include less coalescing solvent in the water-borne film or coating composition (Side A), during formulation. In addition, it has been pointed out that when the desiccant or drying agent itself operates as a filler or other adjuvant, it may desirable to use less filler or adjuvant, in formulating the water-borne film or coating composition (Side A).

In general terms, when the composition is applied to the substrate, there are film forming components or portions and non-film forming components or portions. The non-film forming components or portions include, for example, filler and other adjuvents within the film once set up. Particulate material contained within the film, once applied, is sometimes referred to as "pigment" and the amount of its presence is referred to as pigment volume concentration. With polymer systems, typically pigment volume concentration versus performance data is collected and understood. Then, as the polymer is formulated, the formulator can use such graphs to determine acceptable levels of total pigment volume concentration within the polymer. In general, with techniques according to the present disclosure, as the A Side is formulated, it will be taken into account that, when mixed with the B Side, there will be introduction of further pigment or pigment volume as a result of the desiccant (and any other adjuvent) inclusion.

Thus, again, in some instances it may be desirable to have a lower pigment level in the formulated water-borne polymer composition (the A Side) due to the fact that once mixed with the B Side, other pigment (or additive) (at least in the form of the desiccant and potentially other additive) will be introduced via the B side.

III. Application of the Coating or Film to a Substrate

A. General

The film is applied to the substrate, by providing a wet film (thick or thin) on the substrate and allowing the film to set up. When a 2-component approach such as described herein is used, in general it is desired that the water-borne film-forming or coating composition (Side A) be intimately and continuously mixed with the desiccant composition (Side B) as the application occurs and not substantially before, so that absorption of the free water by the desiccant, from the water-borne coating composition, is not initiated until the application is occurring. This will typically require a rapid process of intimate mixing and application.

In more general terms, the mixture resulting from merely combining the film-forming composition with a desiccant-containing composition (desiccant) will typically have a relatively short pot life. The term "pot life" in this instance, is meant to refer to the length of time after combination, until the combination can no longer be effectively applied, since it has thickened too much. Typically, the pot life for such a mixture will be less than 30 minutes, and often less then five minutes. When spray coating, the pot life may be less than one minute.

Conceptually, any of a variety of techniques for film formation can be used, to apply compositions according to the present disclosure. For example, the techniques can comprise brush application, spray application, roller application, pour application, etc. The particular application approach chosen, may affect the choice of mixing conditions and/or side A or side B composition. The reason is that some applications lend themselves to very quick application after mixing, others require a more substantial pot life. It is anticipated that spray application will often be preferred, since it can be conducted with a very short time period, in some instances, and can be used to accomplish quick coating of a large substrate, for example at a construction site. Also, a spray application can be interrupted at will, with adverse pot life affects in the application equipment, materials at coating.

In many instances it will be desirable to mix and apply the film-forming composition and desiccant composition with continuous (stream) mixing and application. By the terms "continuous mixing" and/or "continuous stream mixing" in this context, it is meant that sources (for example barrels or other containers) of film-forming composition (Side A) and desiccant composition (Side B) are kept separate, and streams from each are fed together with continuous mixing (and eventual application). With such approaches, it will often be preferred that the time period from mixing to application is no more than one minute, often no more than 30 seconds. Indeed, it will be preferred that the total duration from mixing to wet film deposition on the coated substrate be no more than 10 seconds, and be as low as possible, for example 5 seconds or less.

There is no specific requirement, other than management of issues concerning thickening and applicability, regarding the technique of application. Spray application can be used, and will typically be preferred. However, in some instances, brush application, roller application and/or pour application may be desired.

Equipment and techniques now known or developed in the future can be used for the intimate mixing and the application of the composition as a spray. Equipment manufacturers and/or suppliers such as CJ Spray, Inc., Inver Grove Heights, Minn. 55076 and GRACO, Inc., Minneapolis, Minn. 55413, can provide such equipment. The equipment can be enhanced or modified for performance, depending upon the specific application intended. In general, what is required with 2-component applications is that equipment be configured: to separately draw into the sprayer the two compositions to be applied in an appropriate volume ratio; and, to intimately mix the two compositions as the mixture is being sprayed onto or otherwise applied to the substrate.

As an example, with such equipment, Side A and Side B would be drawn out of separate drums or tanks, each sent down a sufficiently long line and mixed near the tip of spraying head. The equipment would, for example, be configured for the desired draw ratio Side A: Side B in proportions as generally described above.

A typical application according to the present disclosure for construction substrates will be application of sufficiently thick wet film application so that various irregularities etc. in the substrate surface are well coated. Examples of variations in construction substrates surface include for example: pores, recesses or indents, penetrations and joints. Pores, for example, might be found in cast (set) concrete surfaces or in concrete block surfaces. By the term "penetration" in connection with a substrate surface, reference is meant to an actual piercing of the substrate, at the surface, for example by a nail, screw, or projecting member, and the reference is meant to refer to coating over or around where the penetration has occurred. The term "joint" is meant to have a broad, general reference and an example can refer to a joint where materials intersect or join, whether that joint is covered with a previously applied sealant (for example caulk) or not.

A typical application of the present invention, to provide coating of a construction substrate or wall, above grade or below grade, will involve a wet film application that is at least 5 mil thick, often at least 10 mil thick, typically at least 20 mil thick, usually at least 30 mil thick and often at least 40 mil thick, for example 40-60 mil thick, inclusive, or even thicker.

The dry film thickness, will be the thickness that results after polymer set up and cure, for example upon take up of the free water by the desiccant. Typically the wet film thickness is applied adequately to provide that the resulting dry film is appropriate to provide the desired protective or other properties intended. With typical application to construction surfaces (such as above grade or below grade exterior walls) an intended result will often be a dry film thickness of at least 5 mil (0.125 mm) often at least 10 mil (0.25 mm), typically at least 15 mil and often on the order of 15-30 mil (0.38-0.75 mm) or thicker. (There is no upper limit on thickness except as practical for the application, so the thickness could be 100 mil (2.5 mm) or even 200 mil (5 mm) in some instances).

As indicated above, the total amount of desiccant preferred in the composition can be calculated based upon the total amount of free water to be applied, given a formulation application rate and thickness of the polymer forming composition. There is no specific requirement that the desiccant be used in substantial excess.

It is noted that an application of water-borne coating compositions (via simultaneously mixing and applying a combination of a desiccant and the film forming composition) can provide many advantages. For example, because reliance is not made solely (or typically even substantially) on evaporative process for film formation and set up, wider temperature ranges and, in effect, lower application temperatures for the environment of application, than are otherwise acceptable, can be accommodated in some instances, for example below 40° F. (4.4° C.), often below 32° F. (0° C.) and in some instances below 20° F. (−6.7° C.). Further, even relatively high humidity circumstances can be accommodated. Also, the resulting relatively quick set up times (usually no more than 1 hour, typically no more than 30 minutes) and almost immediate when sufficient desiccant is used) create substantial advantage especially with thick film application in the field.

Attention is directed to FIG. 1, in which an example application is depicted, schematically. At 1, there is depicted an construction substrate, in the example shown a vertical wall, for coating. The wall or wall section 1, can, for example, be an above grade or below grade exterior wall section. At 2 is depicted a application (in the example spray) apparatus configured to receive therein two separately maintained compositions, via lines 5 and 6 respectively, with (in the example internally of the sprayer arrangement 2) intimate continuous mixing of two feed streams and spraying. The spray application is shown at 10.

Lines 5 and 6 draw compositions respectively from containers 15 and 16. Container 15, in the example depicted the larger container, includes therein, the water-borne film forming composition. Container 16, in the example depicted the smaller container, contains therein, the desiccant composition. For the example depicted in FIG. 1, it is assumed that the volume ratio of Side A (water-borne coating composition) to Side B (desiccant composition) is substantially greater than 1:1 during application.

As indicated above, a variety of mixing application techniques be used, now known or later developed. However, mere proportioners used to apply multi-component systems but which do not carefully control reactive components are typically not adequate. First, they are generally not sufficiently precise, to allow for an application as required. Also, they often rely on a application volume ratio at or near 1:1, which is generally at a lower end of useful range for applications according to the present invention, and usually are not preferred. Further, they often do not mix and apply sufficiently rapidly, to be desirable. That is, they will tend to clog as the desiccant begins to take effect.

In general, mixers or sprayers that operate with static mixers therein can be useful. However, it is necessary to ensure complete, thorough, mixing or continuous film may not result. With a typical static mixer, two separate streams (Side A, Side B) are brought together in the mixer spray head, and are mixed with continuous streaming, as the spraying occurs. The intimate mixing that occurs in the spray head or equipment, combined with a rapid rate at which evacuation of the mixture from the spray head occurs, can provide for a desirable effect.

The techniques described herein can be used to apply materials, i.e. films or coatings, to a very wide variety of types of substrates and materials. These techniques can be applied in providing water-borne polymer depositions on such materials as: masonry, cement, cement board, concrete (poured, cast, precast) wood, fiber board, plaster, plaster board (gypsum board), metal, brick, paper, plastic, rubber, glass, asphalt and various foams and foam board (for example styrene, ioscyanate). For example, with respect to foams, it can be applied to Styrofoam, isocyanate foam, or isocyanate foam board coated with aluminum. The product can be treated or untreated, for example treated or untreated wood products, plywood, oriented strand board, gypsum sheathing or board. Flashing materials can be coated, such as those comprising: polyethylene, polyethylene, PVC, polypropylene, polystyrene, TPO, EPDM, neoprene, synthetic or natural fabrics, stainless steel (for example 304 or 316 stainless steel) copper, aluminum (for example anodized aluminum) lead flashing, Elvaloy KEE (a DuPont roofing product including pvc material). It can be a roof or coated roof. The substrates can be treated materials, for example having a paint coating or epoxy thereon. Indeed, the techniques can be used to apply paint coatings and/or epoxy coatings. The structure can be a metal panel and/or deck. The structure can even a "prepared soil", i.e. a section of earth or soil to which a coating is needed, for example, a soil section having a grid or web therein. The techniques can be applied to coatings sprayed onto piles of stored particulate material, to inhibit weather, for example, wind, effects.

The techniques can be applied at construction locations in advantageous circumstances, where water-borne coatings (for example, latex) were previously not recommended. For example, in cold temperature conditions (typically 40° F.; 4.4° C.) or below, and often at 37° F. (2.8° C.) or below, it is usually not recommended that latex coatings be applied, unless the construction region is tented and provided with heat. With the techniques described herein, it can be possible to apply water-borne coating under ambient conditions (substantial environment) 40° F. (4.4° C.) or below and indeed under 37° F. (2.8° C.) at even lower temperatures, without tenting and environment heat sources. Of course, there are lower limits of possible application, since the composition must be fluid when applied. The issue here, however, is that relatively lower temperature or higher humidity ambient conditions can be managed with the application of compositions according to the present disclosure, than would be possible if mere environmental drying is relied upon.

B. Further Regarding Application Equipment and Techniques, Especially with Spray Applications Herein two general types of equipment are referenced in connection with mixing techniques for two-pot applications, especially used with spray applicators. The two types of equipment and techniques are impingement mixers (i.e. impingement mixing) and static mixers (i.e. static mixing). In general, impingement mixing is a method of mixing in which various streams are forced toward one another, typically at a relatively high velocity to produce thorough mixing in a relatively short time. The mixing technique, then, generally involves streams being directed together, as opposed to using some form of mixer paddles to actually mix the streams. Impingement mixers can be configured to mix liquid streams within the equipment; or, to direct the streams together for mixing outside of the equipment.

In a static mixer (i.e. with static mixing) mixer elements generally comprise a series of baffles or plates (paddles or other physical structures) that cause the streams to mix with one another inside of the equipment. As an example, a helical baffle may be included in a mixing section of the equipment with the streams forced through the helical mixer, to be intimately mixed.

There are three issues of concern, when selecting mixer and film application equipment and techniques according to the present disclosure, to bring together two sides and achieve a good film coating. The three issues generally involve: obtainment of very good mixing; very short residence time in the mixer/applicator; and, avoidance of equipment clogging or deposit issues.

Unless a very high degree of intimate mixing occurs, the film applied may be inconsistent and mottled.

In a typical composition, when the desiccant is merely suspended in a side B composition, the desiccant is immediately active to begin absorbing water as soon as the two sides contact, even before intimate mixing occurs. Thus, the mixing needs to be conducted extremely rapidly, or the film may thicken adequately to cause application problems.

The third problem is deposition in the equipment (clogging). In particular, a technique should be used in which the two components do not cause undesirable levels of formation of film or deposit inside the application equipment, or application may be disrupted. Approaches to avoid this problem can involve mixing the components outside of the equipment (for example, with some types of impingement mixers) or through of a equipment that includes features for cleaning (flushing or purging with gas or liquid) of the internal componentry after film application occurs.

In the remainder of this section, discussion of experiences with various types of applicators is provided, for a general understanding of issues relating to application techniques.

1. Application of Two Component Water-Borne Coating Using a Plural Component Airless Sprayer.

An example of plural component airless sprayer is the Graco XB-70 plural component sprayer available from Graco, Inc. of Minneapolis, Minn. Such equipment has ability to store A side and B side components in separate containers, and bring them together at a ratio, for example, of 2.5 to 1.0 volume ratio in a mix manifold, and then to deliver the mixed product to the substrate(s) via airless pumping system, and ultimately to a spray-gun at pressure sufficient to atomize the liquid. Initially, evaluation of such a system when used with a static mixer, showed that it did have the ability to deliver a rapidly curing product substrate(s). However, the rapid setting properties of a typical system according to the present disclosure led to cleaning issues, from depositions in the mixer manifold, fluid lines and spray-gun assembly. Thus, while such equipment was capable of applying a desirable coating, it was less than fully desirable for efficient commercial application.

The shortcoming of using such a system can be addressed, if the mixing can be conducted in the sprayer itself with a very short lifetime, along with a construction for cleaning the equipment, or if the mixing can be conducted outside of the sprayer, as the application occurs. The requirements, led to investigation of impingement mixing, as a potential viable alternative. That is, although static mixing techniques could be applied to get a desirable coating, it was desired to investigate impingement mixing and impingement mixers for application, for the reasons observed.

2. Impingement Mixing Application

Impingement mixing techniques can be applied, to alleviate some of the issues with static mixing. An issue with impingement mixers, however, is that it is important to ensure a high quality intimate mixing for application of the film.

Impingement mixing apparatus can be configured for mixing of the streams inside of the equipment, or mixing of two streams that are directed together immediately outside of the equipment, as the application occurs. Either approach can be used in application of the techniques according to the present disclosure. However, when the mixing occurs inside of the equipment, it is preferred that the equipment be configured for flushing (purging) of the mixing chamber, to help protect against deposition of materials therein.

For consideration of application with impingement mixed techniques, a plural component impingement mix purge and spray gun was obtained from Graco, Inc. of Minneapolis, Minn. The equipment is available under the mark "Fusion."

The particular equipment selected uses an air purge. That is, the chamber in which the two sides (side A and side B) are mixed is periodically purged with air. Alternate equipment configurations can be used, in which the purging is conducted with an alternate gas, or with a liquid.

Specifically, application equipment was configured in which a Graco XB-70 plural component sprayer was fitted with a Graco Fusion impingement mixing airless spray gun as an alternative to use a plural component spray with a static mixer.

With such equipment, the two fluid lines (side A, side B) are each directed by pumping, into a chamber where intimate mixing occurs, but without the use of a static mixer system, (i.e. without blades or paddles to cause mixing, etc). The particular equipment chosen is configured so that this mixing occurs when the trigger on the gun is pulled back, at which time the two fluid streams are directed into the mixing chamber and immediately outwardly from the nozzle of the gun as the spray application. That is, the mixing occurs immediately upstream of the nozzle. The equipment is configured so that when the trigger is released, direction of the two liquid streams into the mixing chamber is shut down, and a purge stream (in the example, a gas such as air) is immediately directed through the mixing chamber and nozzle.

Application was found to be quite effective, using a formulation as characterized below. In example conducted, application was conducted at application temperatures that were near freezing (32° F. or 0° C.). The two component water borne coating system described was applied to concrete block and to densglass (gypsum panel material available from Georgia-Pacific) surfaces, at wet film thicknesses ranging from approximately 10-250 mils or greater. The concrete block surfaces were vertical. It is noted that prior to the coating application, the concrete surfaces were observed to be coated with a thin layer of ice that was removed by flame. The blocks, however, were damp at the time of application.

The application equipment was set a volume ratio of side A to side B of 2.5:1.0. The surfaces appeared dry to the touch in less than an hour, and the applied film was observed to be thoroughly dried at less than three hours regardless of film thickness. After approximately 24 hours it was noted that all of the applied films were thoroughly cured and firmly attached to their respective substrates.

Side A and side B component mixtures used in the experiment were as follows:

A. Side A (Polymer Composition)

1. Composition #1

| Ingredient # | RAW MAT'L | LBS | #/GAL | GAL. |
|---|---|---|---|---|
| 1 | TAP WATER (carrier solvent) | 175.00 | 8.33 | 21.01 |
| 2 | OPTIXAN D (thickener) | 4.00 | 7.09 | 0.56 |
| 3 | AMP 95 (pH adjuster/stabilizer) | 0.50 | 7.86 | 0.06 |
| 4 | KTPP (water softener) | 1.00 | 7.93 | 0.13 |
| 5 | BYK 151 (pigment dispersant) | 4.00 | 9.08 | 0.44 |
| 6 | IGEPAL CTA-639-W (wetting agent) | 2.00 | 8.85 | 0.23 |
| 7 | FOAMSTAR A-10 (defoamer) | 2.00 | 7.20 | 0.28 |
| 8 | TIOPREM "C" Gray (TiO2 opacifier) | 25.00 | 34.22 | 0.73 |
| 9 | PROPYLENE GLYCOL (freeze/thaw agent) | 23.67 | 8.62 | 2.75 |
| 10 | CARBOSET AE-960 (acrylic latex) | 484.50 | 8.50 | 57.00 |
| 11 | EXTENDOSPHERES TG (extender pigment) | 84.00 | 6.80 | 12.35 |
| 12 | NUOSEPT 95 (anti-microbial) | 2.00 | 9.49 | 0.21 |
| | DISPERSION TOTALS | 807.67 | | 95.75 |

2. Composition #2

| Ingredient # | RAW MATL | LBS | #/GAL | GAL. |
|---|---|---|---|---|
| 13 | TEXANOL[1] (coalescent) | 15.86 | 7.93 | 2.00 |
| 14 | POLYPHASE 663[2] (mildewcide) | 4.00 | 9.60 | 0.42 |
| 15 | FOAMSTAR A-10 (defoamer) | 4.00 | 7.20 | 0.56 |
| 16 | RHEOLATE 300 (anti-sag agent) | 1.00 | 8.72 | 0.11 |
| 17 | AMP 95 (pH adjuster/stabilizer) | 2.80 | 7.86 | 0.36 |

-continued

| Ingredient # | RAW MATL | LBS | #/GAL | GAL. |
|---|---|---|---|---|
| 18 | TINT-AYD HC 6317 (black shader) | 0.33 | 10.35 | 0.03 |
| | SUB TOTALS | 835.66 | | 99.22 |

3. Final Side A Composition: Composition #1 was Combined with Composition #2 and the Following was Added:

| | | | | |
|---|---|---|---|---|
| 19 | TAP WATER | 6.48 | 8.33 | 0.78 |
| | TOTALS (wt./100 gal. in red) | 842.14 | | 100.00 |

B. Side B (Desiccant Composition)

| Ingredient # | RAW MAT'L | LBS (100 gal Mix) | #/GAL | GAL |
|---|---|---|---|---|
| 20 | NMP (carrier solvent) | 273.83 | 8.560 | 31.99 |
| 21 | Garamite 1958 (suspending aid) | 20.00 | 13.333 | 1.50 |
| 22 | KLUCEL M (thickener) | 3.00 | 7.400 | 0.41 |
| 23 | GLYCOL ETHER PNP (carrier solvent) | 164.12 | 7.380 | 22.24 |
| 24 | BYKUMEN (dispersing aid) | 5.00 | 7.330 | 0.68 |
| 25 | RED OXIDE RO-2597 (red oxide pigment) | 5.00 | 40.891 | 0.12 |
| 26 | LEHIGH TYPE 1 CEMENT (desiccant) | 197.10 | 26.000 | 7.58 |
| 27 | EXTENDOSPHERES TG (extender pigment) | 175.00 | 6.800 | 25.74 |
| | DISPERSION TOTALS | 843.05 | | 90.25 |

After the above was thoroughly mixed glycol ester PNP was added as follows:

| | | | | |
|---|---|---|---|---|
| 28 | GLYCOL ETHER PNP (carrier solvent) | 71.93 | 7.380 | 9.75 |
| | TOTALS | 914.98 | | 100.00 |

The side A and side B compositions are then used as described above to create the coating. The above identified ingredients are as follows (except where elaboration is unnecessary):

Ingredient #2—A xanthan gum thickener (GAS: 11138-66-2) available from ADM

Ingredient #3—A primary multifunctional amine available from Agnus (DOW).

Ingredient #4—Potassium tri-phosphate available from Shifang Kindria May Chemical Co, Ltd on alibaba.com Ingredient #5—A wetting and dispensing additive from Byk Chemical, for example through AITANA Ingredient #6—Nonylphenol ethoxylate wetting agent (CAS #68412-54-4) available from Rhodia Italia; Milano, IT.

Ingredient #7—A defoamer available from Cognis (BASF)

Ingredient #8—A titanium dioxide opanifier available from TOR Minerals International, Inc.; Corpus Christi, Tex.

Ingredient #10—an acrylic emusion available from Lubrizol, Cleveland, Ohio 44141-3247

Ingredient #11—Hollow ceramic microspheres available from Sphere One, Inc. comprise seal fired fly ash biproduct and crystalline silica.

Ingredient #12—A preservative available from Ashland, Inc.

Ingredient #13—Propanoic acid, 2-methy, monoester with 2,2,4-trimethyl-1.3 pentanediol available from Eastman Chemical Co.

Ingredient #14—An aqueous dispersion fungicide available from Troy Corp.

Ingredient #15—A defoamer available from Cognis (BASF)

Ingredient #16—A nonionic thickener available from SpecialChem

Ingredient #18—A colorant available from SpecialChem

Ingredient #20—N-methylpyrrolidone available from BASF

Ingredient #21—A mixed mineral thickening agent available from Southern Clay Products (Rockwood Specialties), Gonzalez, Tex. 78629

Ingredient #22—A hydroxypropyl cellulose thickener available from Kremer Pigments, Inc., NY, N.Y. 1001

Ingredient #23—A solvent available from Dow Chemical Co.

Ingredient #24—A high molecular weight wetting and dispensing additive available from BYK (Altana Corp)

Ingredient #25—An iron oxide pigment available from Elements Pigments, Inc., East St. Louis, Ill. 62204

Ingredient #26—A low akali Portland cement

Ingredient #27—Identified above

IV. Additional Comments Regarding Formulation of Side A and Side B

A. pH Adjustment

In development of side A and side B components, for application in accord with the principles, techniques and methods described herein, it is advantageous to ensure that the side A and side B components are sufficiently compatible, so that rapid, efficient, mixing will occur, under the application conditions. To facilitate mixing, it is desirable that the pH of the two compositions be relatively similar. That is, the more different the pH, the less effectively mixing will occur under the conditions of application.

When the desiccant chosen is a Portland cement, even with a relatively low alkaline Portland cement, pH of the side B will tend toward alkaline. To facilitate the mixing, the side A component is generally adjusted in pH to be similar that of the side B. In the example described above, the side A composition was provided with a pH adjustor. Typically, an amine adjustor can be used, for example in the form of a multi-functional amine (as an example AMP 95). This generally was used in an amount sufficient to adjust the pH of the overall side A composition to be more alkaline, typically to about 9-10, to facilitate combining.

B. Protective Colloids

Also, in general, water-borne coating systems that are based on emulsion polymers comprise a dispersion of resin (latex polymer) and pigment particles in an aqueous medium. In order to produce storage stable products based on these components, is preferred to keep the particles apart from one another and suspended in the aqueous medium. Additives that provide this function are generally referenced as "protective colloids." There are typically themselves water soluble polymers of variant molecular weight that hold particular matter in suspension and prevent them from premature coagulation by increasing the viscosity (i.e. thickening) the aqueous phase of the coating system. They also help control and maintain the rheological properties of the coating system, through the application process. An example of a water-soluble polymer that provides these benefits to the A side described above, is xanthan gum (in the example Optixan D).

The side B component of the two component coating system described above, also comprises a dispersion of particulate matter in a carrier solvent, and has suspension, stabilization and rheological requirements that are similar to the A side component. However, the B side dispersing media is an organic solvent, so a water soluble polymer such as xanthan gum cannot be used as a protective colloid for this type of system. Ideally, a protective colloid for the B side component would be a polymer that is soluble in the organic solvent, but is water soluble (or at least water miscible) when combined with the A side component. An example of such a polymer type is non-ionic hydroxypropyl cellulose ether (used as the ingredient Klucel M). It is typically soluble in one of the B side carrier solvents (i.e. n-methyl pyrrolidone). As a protective colloid for the B side component the Klucel M becomes water soluble when it comes in contract with the A side components and eliminates particulates (i.e. problem coagulum) that might otherwise tend to form when the side A and side B are brought together.

In more general terms, then, in typical applications according to the present invention, the side A component will include a protective colloid and will often be adjusted in pH to render a pH similar to the side B component. Also typically, the side B component will include a polymer component that is not only soluble in the B side carrier solvent but is also soluble in water. A typical such material is non-ionic hydroxyl propyl cellulose ether(s), although alternatives are possible.

C. Solids Content

Solids content can vary from 5% to 90%. A limiting factor on the high side is mechanical equipment ability to pump the resulting high viscosity materials. Typically, the solids content of the side A composition will be no more than about 60% by volume, preferably no more than about 55%. Typically, the polymer composition used to form side A will be a composition that, prior to incorporation in the formulation, was no more than about 70% high solids polymer by volume, typically no more than 60%.

While alternatives to the above are possible, such formulations will be preferred to accomplish the desired results intended.

D. Use of Water Soluble or Miscible Solvent in the B Side

As explained above, it is often desirable to use a water soluble or water miscible solvent in the B side. This can provide advantage in facilitating the mixing. Typically, NMP, (n-methyl pyrollidone) PNP (glycol ether(s)) or mixtures will be used, but alternatives are possible.

E. Techniques Relating to Management of VOC Levels

In some instances, it is desired to provide the formulation in a "low VOC" manner, to manage formulations to regulations in various locations where the compositions might be used. The A side, due to the use of water as the solvent, produces relatively low contribution to VOC's. The B side, however, relies on non-aqueous solvents, and thus can contribute substantially to the VOC's. Overall VOC levels can be managed by using the following techniques:

1. Using an exempt solvent to the extent possible in formulating the B side. An example would be to use film enhanced 400 from Eastman. Some or all of the NMP or PNP (VOC contributing materials) could be replaced with such solvents. Other useable solvents for the B side include: Oxifilm 351 (from OXEA); Oxi-cure 1000 and/or Oxi-cure 2000 (vegetable based esters from Cargill), although alternatives are possible.
2. Of course using a relatively high volume ration of A side to B side can also be of assistance in rendering low VOC levels.
3. Incorporating material that takes up volume on the B side without adding VOC's are desirable. Examples include: incorporating polymer (typically lower molecular weight polymers) on the B side; and/or, using filler in the B side. An example polymer completely soluble in the B side is a solution acrylic such as AC-80 from Eliochem.

V. Alternate Applications of the Techniques Described Herein

The techniques described herein were developed to address issues of applying protective coatings to construction substrates, especially in the field at construction sites, for example building sites or building repair sites. Thus, the techniques described were developed to be applicable with the types of compositions involved for such coatings and, the environmental limitations and needs at the sites.

The techniques described, however, can be applied in other circumstances, whether thick film or not, in a wide variety of industries and for a wide variety of purposes. For example, the coating can have purposes other than protection or in addition to protection. The coating can be for decoration, for example, to seal, or can be to modify the surface characteristics of the resulting substrate.

In some industries it is desirable to dry applied films with ovens, heat lamps, IR lamps, blowers or heat applied from other sources. Especially with thick film applications, the problems with blistering, uneven drying and other film damage can result while evaporation of water from the applied film is completed. With use of techniques involving addition of a desiccant composition during application, and the very rapid internal drying of the film that results, such problems and issues can be alleviated. However, it is noted that the techniques according to the present disclosure are generally limited to application in situations involving relatively rapid application techniques that can be conducted as the two compositions are mixed together.

In addition, the techniques can be applied with multi-component systems in which the film being applied is a very thick material to seal a groove or joint, such as a caulk. For example, multi-component caulking systems, in which the A side is a water-borne emulsion, can be rapidly set up with the B Side including a desiccant according to the present disclosure. It is noted that B Side can include a reactant for the composition, in addition to the desiccant. The term "film" or "coating" as used herein, is meant to include within its scope, a joint sealant such as a caulk.

By the terms "substrate" and other terms, as used herein without further specification, it is not meant to be suggested that the application is limited in any manner with respect to the choice of substrate, purpose of the coating, thickness or thinness of the film, etc.

VI. Disclosure Added to Disclosure Corresponding to U.S. Ser. No. 61/654,293 after Mar. 15, 2013

As indicated above, a variety of water-borne film forming compositions can be used. A statement of such compositions, modified from the disclosure of U.S. Ser. No. 61/654, 293, is that such film forming compositions can comprise: latexes/Dispersions/Emulsions/SOL(s)/and/or Thermoplastic or Thermosetting Solution Polymers of: acrylic(s), acrylonitrile butadiene rubber(s) (NBR), asphalt, carboxylated acrylonitrile butadiene rubber(s) (XNBR), butyl rubber(s) (IIR), EPDM, epoxies, epoxy acrylate(s), fluoroplastic resins, natural rubber(s), neoprene(s), paraffin, polyacrylics, polybutyl acrylate synthetic polyisoprene rubber(s) (IR), polyethylene(s) (HDPE, LDPE, etc), polyolefin(s), polypropylene(s), polyurethane(s), polyvinyl acetates, polyvinyl chloride(s), polychloroprene rubber(s) (CR, Neoprene), polyvinyl butyral(s), polyvinylidene chloride(s), silicone acrylate(s), styrene acrylic(s), styrene butadiene rubber(s) (SBR), carboxylated SBR, Teflon, urethane acrylate(s), vinyl pyridine(s); and, mixtures, blends or other combinations thereof.

VII. General Comments and Observations

According to an aspect of the present disclosure, a method of forming a film on a substrate is provided. The method generally involves applying a wet film to the substrate of: (1) water-borne film forming composition; and, (2) desiccant composition including an amount of desiccant adequate to at least partially take up (capture or absorb) free water in the water-borne film forming composition, as applied. Typically, the water-borne film forming composition and the desiccant composition are mixed immediately prior to, or during, application; i.e. the application technique is a two component technique. Of course, after application, the film is allowed to set up (cure) on the substrate, with at least partial absorption of free water in the film by desiccant contained in the film. In many instances, with solid desiccant, the water becomes trapped in the crystalline structure of the desiccant, in the initial capture.

A typical application approach will be a spray application with mixing of the two compositions occurring within the sprayer equipment continuously, as the spraying occurs.

Typically, the step of applying comprises a wet film thickness of at least 5 mils (0.125 mm) often at least 10 mils (0.25 mm), usually at least 20 mils (0.5 mm); in many instances often at least 30 mils (0.75 mm). Indeed, often the coating will be applied in a wet thickness of at least 40 mils, for example within the range of 40-60 mils (1-1.5 mm), inclusive, or even much greater, for example at least 100 mils (2.5 mm) or even at least 200 mils (5 mm) or greater.

The substrate can comprise a variety of substrates and may include, for example, vertical walls, although alternatives are possible. With applications described herein, it may be practical to even apply a coating to a ceiling or other overhead structure, since with rapid drying, problems with dripping or film distortion can be minimized.

A wide variety of substrates can be accommodated with techniques according to the present disclosure. Although many construction substrates will comprise cast concrete and/or concrete block, a wide variety of other substrates such as wood, fiber board, plaster, plaster board, metal, paper, foam, glass or plastic, asphalt (including modified asphalt) etc. can be accommodated. Unless otherwise stated, there is not meant to be any specific limitation with respect to the type of substrate involved.

The substrate can include more than one material, and can include joints and/or penetrations therein.

Unless otherwise stated, there is no specific requirement that the desiccant be present in an amount necessary to absorb any specific amount of the free water, other than a sufficient amount to provide for improvement in the time of drying. However, often adequate desiccant is contained within the applied film, to absorb at least 50%, often at least 30%, typically at least 50%, often at least 75% and sometimes at least 90% of the free water present in the applied composition; i.e. as applied. Indeed, desiccant may be present in an amount adequate to absorb at least 95% of the free water calculated to be in the water-borne film forming composition, as applied. In some instances sufficient desiccant can be included to absorb 100% of the free water calculated to be present, and indeed the desiccant can, in some applications, even be used in excess.

In typical application, the water-borne film forming composition (Side A) and the desiccant composition (Side B) will be provided in a volume ratio (Side A to Side B) of at least 1:1, usually at least 2:1, sometimes at least 3:1, and in typical practical applications, within a ratio of 2:1 to 12:1, (sometimes 2:1-8:1) inclusive. This is desirable, as it is preferable to ensure as much film forming composition is applied to the substrate, per unit area, as is practical and desired for the intended application.

A wide variety of desiccants can be used. Unless otherwise specified, no specific limit on the desiccant or its nature, other than compatible with the materials involved, is intended. Example usable desiccants include portland cement; calcium oxide; perlite; vermiculite; attapulgite clay(s); bentonite clay(s); phosphorous pentoxide; aluminum phosphate; aerogel(s); calcium sulfate (plaster of Paris) polyacrylic acid salts (for example sodium salts) and/or, glycerin. A wide variety of additional desiccants may be used. Mixtures of desiccant(s) can be used. The desiccant choice will be primarily based on its effectiveness to absorb the amount of water involved. However, other factors may relate to: availability; cost; dispersability; ability to function as an adhesion promoter for the system involved; characteristics as polymer filler; color transparency; and other, similar, factors.

Although alternatives may be possible, typically, the desiccant composition will comprise desiccant dispersed in a non-aqueous carrier. A variety of non-aqueous carriers can be used. Typically, it will be convenient to select as the non-aqueous carrier, a liquid (or liquid mixture) that is water-soluble or miscible and that operates as a coalescing solvent for the polymer system of choice. Typical usable coalescing solvents will comprise relatively high molecular weight ester(s) and ester alcohol(s), or glycol ether(s).

Usable materials, in some applications for the non-aqueous carrier comprise plasticizer(s) for the polymer system of concern.

The desiccant composition typically includes a dispersion agent, i.e. a polymer capable acting as a dispersant for the desiccant involved. Typically anionic dispersant(s) (surfactant(s)) will be used.

The desiccant composition may also include a suspending or thickening agent. A variety of such agents can be used, for example clays or low molecular weight polymers.

A film forming composition will generally comprise polymer resin incorporated in an aqueous carrier, for example as a latex or sol. For construction substrates, a wide variety of polymers, typically having a $T_g$ or glass transition temperature of about −40° C. will be desired, especially for cold climates. Acrylic polymers or copolymers, sometimes blended with other polymeric materials, can be very useful. Styrene-based, or styrene-unit containing, polymers, are well known as construction material coatings, and can be used in applications described herein.

With techniques as described herein, application can occur even when the substrate (and surrounding ambient conditions) is relatively cold, for example 40° F. (4.4° C.) or lower, in some instances even at 37° F. (2.8° C.) or lower Also according to the present disclosure are provided two-part compositions or sets for application of a protective film to a substrate. The two-part composition set is formulated so that the two components can be mixed together simultaneously with applying to practice the techniques described. The two-part composition or set generally comprises a water-borne film forming composition as characterized, and a separate desiccant composition as characterized.

Also according to the present disclosure, a desiccant composition is provided that can be mixed with a water-borne film-forming composition, during application, to provide advantageously applied water-borne films on substrates. The desiccant composition can be generally as described.

Also according to the present disclosure, coated substrates are provided, generally through application of the two-part or two component system as characterized above, typically via applications of the techniques described above. The coated substrate can be a wide variety of materials including, for example: cast concrete; concrete block; wood; fiber board; plaster; plaster board, metal, paper, foam(s), glass, plastics and even ground (earth) surfaces. There is no specific limit to the number of, and type of, substrates which these can be applied in some form. The techniques are particularly advantageous in providing a wet thick films and thick film coatings, although alternatives are possible. Because the techniques are good for application of thick films to substrates, substrates having pores or irregularities, joints and/or penetrations therein can be readily accommodated.

It is not required that all of the features and techniques characterized herein above be applied, in order for coating, coating applications or components thereof, to be provided with advantage, in accord with the present disclosure.

What is claimed:

1. A system for forming a film on a substrate, the system comprising:
    a first component comprising a water-borne film forming composition;
    a second component comprising a desiccant that is at least partially active, in an amount adequate to at least partially take up free water in the wet, water-borne, film; and
    an impingement-mixing spray apparatus that applies, by spray coating, the wet, water-borne, film to the substrate by mixing the first and second component streams by impingement mixing near a tip of a spray head, before application on the substrate.

2. The system of claim 1 wherein the two component streams are mixed outside of the impingement-mixing spray apparatus.

3. The system of claim 1 wherein the two component streams are mixed inside of the impingement-mixing spray apparatus.

4. A system according to claim 3 comprising a gas purging system that purges the impingement-mixing spray apparatus after application of the first and second components to the substrate.

5. A system according to claim 3 comprising a liquid purging system that purges the impingement-mixing spray apparatus after application of the first and second components the substrate.

6. A system according to claim 1 wherein the desiccant comprises a carrier fluid.

7. A system according to claim 1 wherein the desiccant is present in at least a sufficient amount to absorb 5% of free water in the water-borne film forming composition, as applied.

8. A system according to claim 1 wherein the impingement-mixing spray apparatus mixes the water-borne film forming composition with desiccant composition, prior to application, in a volume ratio of at least 1:1 of water-borne film forming composition-to-desiccant composition.

9. A system according to claim 1 wherein the desiccant is selected from: Portland cement; modified Portland cement; calcium oxide; perlite; vermiculite; attapulgite clay(s); bentonite clay(s); phosphorous pentoxide; aluminum phosphate, aerogel(s); and mixtures thereof.

10. A system according to claim 1 wherein the desiccant is contained in a desiccant composition comprising desiccant dispersed in non-aqueous carrier selected from water miscible and soluble materials.

11. A system according to claim 10 wherein the non-aqueous carrier is, at least in part, coalescing solvent for the polymer in the aqueous-based film forming composition.

12. A system according to claim 1 wherein the water-borne film forming resin composition comprises acrylic polymer.

13. A system according to claim 1 wherein the water-borne film forming resin composition comprises styrene-butadiene rubber.

14. A system according to claim 1 wherein the water-borne film forming resin composition comprises polyvinyl chloride.

15. A system according to claim 1 wherein the water-borne film forming resin composition comprises of a blend of acrylic copolymer with polyurethane polymer.

16. A system according to claim 1 wherein the wet film, as applied, further includes suspending agent.

17. A system according to claim 1 wherein the film forming composition includes pH adjustor.

18. A system for forming a film on a substrate, the system comprising:
    a first component comprising a water-borne film forming composition;
    a second component comprising a desiccant that is at least partially active, in an amount adequate to at least partially take up free water in the wet, water-borne, film, wherein the desiccant is included in a desiccant composition comprising desiccant dispersed in non-aqueous carrier selected from water miscible and water soluble materials; and
    a spray apparatus that applies, by spray coating, a wet, water-borne, film to the substrate by mixing streams of the first and second components near a tip of a spray head, before application on the substrate.

19. A system for forming a film on a substrate, the system comprising:
    a first component comprising a water-borne film forming composition;
    a second component comprising a desiccant that is at least partially active, in an amount adequate to at least partially take up free water in the wet, water-borne, film; and
    a spray apparatus that applies the first and second components as simultaneous continuous streams that mix as the application occurs.

* * * * *